(12) United States Patent
Geron et al.

(10) Patent No.: US 7,702,191 B1
(45) Date of Patent: Apr. 20, 2010

(54) ELECTRO-OPTICAL CHIP ASSEMBLY

(75) Inventors: Amir Geron, Modi'in (IL); Jacob Hasharoni, Sarigim (IL); Jeffry Levy, Tel Aviv (IL); Michael Mesh, Kfar Saba (IL); Yosef Paltiel, Mazkeret Batya (IL)

(73) Assignee: Compass Electro-Optical Systems Ltd, Natanya (IL)

( * ) Notice: Subject to any disclaimer, the term of this patent is extended or adjusted under 35 U.S.C. 154(b) by 0 days.

(21) Appl. No.: 12/402,537

(22) Filed: Mar. 12, 2009

Related U.S. Application Data

(60) Provisional application No. 61/036,106, filed on Mar. 13, 2008.

(51) Int. Cl.
*G02B 6/12* (2006.01)
(52) U.S. Cl. .............................. 385/14; 385/88; 385/89; 385/92
(58) Field of Classification Search .................... 385/14, 385/88, 89, 92, 93, 94, 53; 438/25, 26, 27, 438/29, 31
See application file for complete search history.

(56) References Cited

U.S. PATENT DOCUMENTS

| | | | |
|---|---|---|---|
| 5,424,573 A * | 6/1995 | Kato et al. ................... 257/431 |
| 6,492,698 B2 * | 12/2002 | Kim et al. .................... 257/432 |
| 6,525,944 B1 * | 2/2003 | Li ............................... 361/760 |
| 6,613,597 B2 * | 9/2003 | Stack ........................... 438/27 |
| 6,676,302 B2 * | 1/2004 | Cheng et al. .................. 385/88 |
| 6,910,812 B2 * | 6/2005 | Pommer et al. ............... 385/92 |
| 7,228,020 B2 * | 6/2007 | Weigert ....................... 385/14 |
| 7,544,527 B2 * | 6/2009 | Benner et al. ................. 438/29 |
| 2003/0201462 A1 * | 10/2003 | Pommer et al. ............. 257/200 |
| 2007/0205479 A1 * | 9/2007 | Dangel et al. ............... 257/432 |

* cited by examiner

*Primary Examiner*—Brian M Healy
(74) *Attorney, Agent, or Firm*—Deborah Gador

(57) ABSTRACT

An optoelectronic chip assembly including a printed circuit board (PCB) coupled to a substrate, an aperture formed through the printed circuit board and through the substrate, a heat sink, an array of active electro-optical elements mounted in the aperture and connected to a driving chip controlled by the PCB, wherein the driving chip is coupled to the heat sink. Preferably, the assembly further includes a plurality of passive optical elements disposed for optical communication and data transfer with said active electro-optical elements, but thermally isolated therefrom.

17 Claims, 1 Drawing Sheet

ELECTRO-OPTICAL CHIP ASSEMBLY

This application claims the benefit of U.S. Provisional Application No. 61/036,106, filed Mar. 13, 2008.

FIELD OF THE INVENTION

The present invention relates to a printed optoelectronic chip assembly, in general and, in particular, to a printed optoelectronic chip assembly for optical interconnections.

BACKGROUND OF THE INVENTION

Most of the solutions for optical interconnects presented on the market use 1-dimensional arrays of optical sources and receivers. These solutions, which give excellent performance for small arrays, are not scalable and cannot work with a large number of optical sources and receivers. In order to send and transfer a large amount of data, the array approach does not work, and 2-dimensional matrices must be used.

With small arrays, the connection from the electronic elements (drivers on the side of the transmitter and amplifiers on the side of the receiver) to the optical elements (such as VCSELs and photodiodes, accordingly) is carried out by bonding, while the electronic driving chip is relatively simple. When the larger and 2-D matrix is used, the electronic circuits are more complicated and more electrical power is required. Heat dissipation problems are observed and frequently thermo-stabilization is required. Also, connection of a large bundle of lenses and fibers to the matrices of VCSELs and photodiode chips is required, and mechanical, as well as thermal, stability of the resulting assembly is crucial.

In conventional interconnects, either there is no optical interface, or the active optical elements do not generate very much heat, so no heat sink is required, or the active optical elements are mounted on the PCB and cooled by a heat sink.

SUMMARY OF THE INVENTION

There is provided according to the present invention an optoelectronic chip assembly including a printed circuit board (hereinafter: PCB), a heat sink, a large matrix of drivers and active optical elements coupled by holders to the heat sink, a substrate bridging between the PCB and the drivers, and insulation between the passive optical elements and the matrix of drivers, preferably integrated in a driver chip, and active optical elements. This arrangement enables more than Terabit per second of data transfer. The driver chip includes both analog and digital circuits.

There is thus provided in accordance with the present invention an optoelectronic assembly including a heat sink, a plurality of active optical elements coupled to the heat sink, a plurality of passive optical elements disposed in optical communication with the plurality of active optical elements, and a structure mounted on the heat sink for supporting the plurality of passive optical elements mechanically and thermally isolated from the plurality of active optical elements.

There is also provided, in accordance with the present invention, an optoelectronic chip assembly including a printed circuit board (PCB) coupled to a substrate, an aperture formed through the printed circuit board and through the substrate, a heat sink, an array of active electro-optical elements mounted in the aperture and connected to a driving chip controlled by the PCB, wherein the driving chip is coupled to the heat sink. Preferably, the assembly further includes a plurality of passive optical elements disposed for optical communication and data transfer with said active electro-optical elements, but thermally isolated therefrom.

There is further provided, in accordance with the invention, an optoelectronic chip assembly including a plurality of passive optical elements; a plurality of active electro-optical elements disposed for optical communication with the passive optical elements; a heat sink; a matrix of drivers for the active electro-optical elements coupled to the heat sink; a printed circuit board (PCB) for controlling the matrix of drivers; and a substrate bridging between the PCB and the matrix of drivers; wherein the passive optical elements are thermally isolated from the active electro-optical elements.

There is also provided, in accordance with the invention, a method for forming an optoelectronic assembly, the method including: providing a heat sink; coupling a printed circuit board (PCB) to a substrate; forming an aperture through the printed circuit board and through the substrate; coupling an array of active electro-optical elements to the substrate for control of the elements by the PCB; mounting the array of active electro-optical elements in the aperture; and coupling the driving chip to the heat sink.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
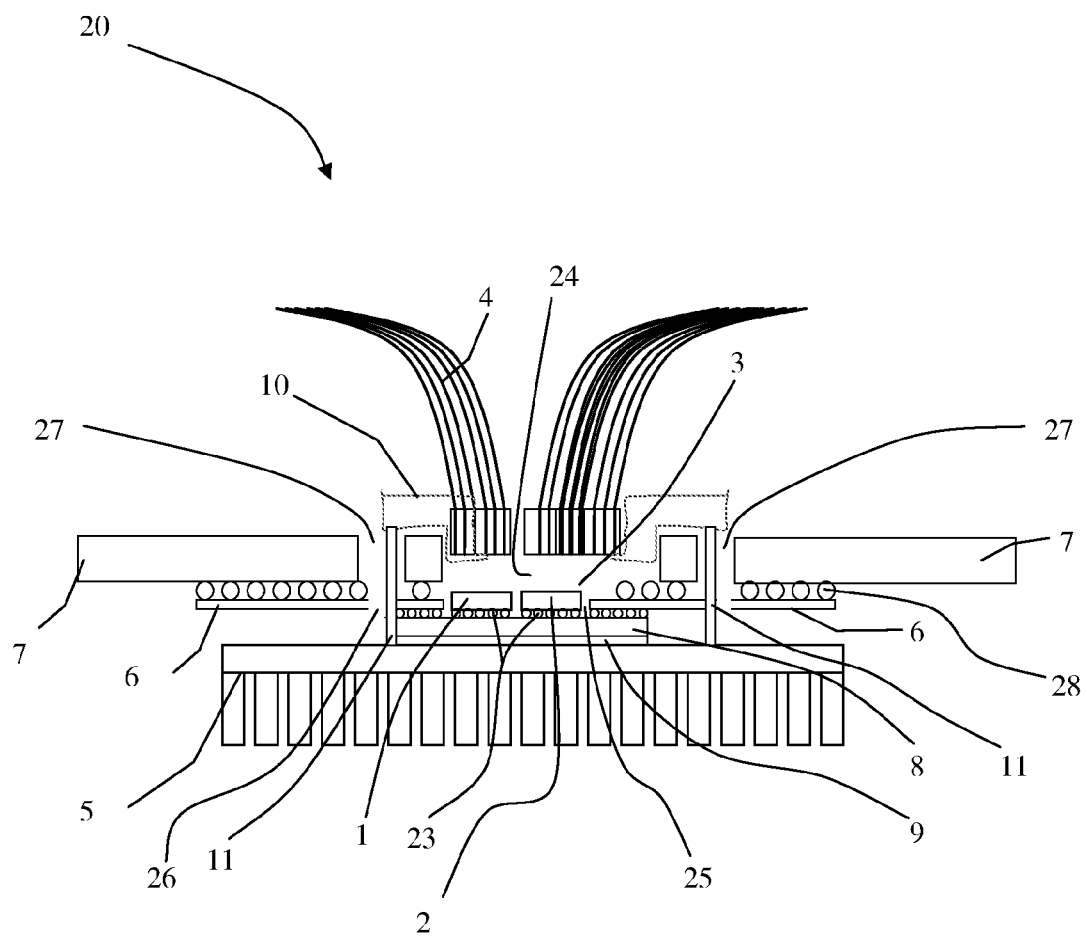
FIG. 1 is a schematic illustration of an optoelectronic chip assembly constructed and operative in accordance with one embodiment of the present invention.

The present invention relates to an optoelectronic chip assembly which is capable of achieving high interconnect rates, without losing stability. Thus, the present assembly addresses the three major challenges for achieving very high rate (preferably more than Tb/s (Terabit per second)) optical interconnects capacity: connecting and driving all the elements in the matrix structure; thermal stability; and mechanical stability of the final assembled device.

With reference to FIG. 1, there is shown an optoelectronic chip assembly 20 constructed and operative in accordance with a preferred embodiment of the present invention. Chip assembly 20 includes a printed circuit board 7 (hereinafter: PCB) coupled to and controlling a large matrix of drivers for a plurality of active optical elements. In this embodiment, the matrix of drivers is embodied in a driving chip 8. The active optical elements can be optical sources, optical detectors and/or optical modulators, among others. An aperture 24 is provided in PCB 7 to permit optical communication and data transfer between a plurality of passive optical elements, here illustrated as fiber bundles 4, and the active optical elements. A substrate 6 provides bridging between the points on the PCB 7 and the drivers on chip 8, as by means of bumps 28 (part of the flip-chip bonding process), to provide electrical contact between PCB 7 and substrate 6 and permit a high density of flip-chip bonds between them.

The active optical elements in the illustrated embodiment are bottom emitting VCSELs in a matrix 1 and a photodiodes matrix 2 connected, as by flip-chip bonding 23, to driving chip 8. It will be appreciated that the coupling can be bumps or pillars, for reducing thermal tension and providing flexibility. Driving chip 8 is preferably based on CMOS technology and preferably has both analog and digital circuitry for receiving and transmitting data both electronically and optically (e.g., including logic or a memory chip and analog drivers for the lasers).

It is a particular feature of the invention that a heat sink 5 serves as a base for the entire optoelectronic assembly, with chip 8 being coupled thereto. Preferably, chip 8 is coupled directly to heat sink 5. In the illustrated embodiment, heat sink 5 includes a plurality of cooling fins and is coupled to chip 8, for example, using a thin thermal bonding layer 9 (for example, Indium based). An aperture 25 is provided in substrate 6 in registration with aperture 24. Together, apertures 24 and 25 enable communication between fiber bundles 4 and VCSELs matrix 1 and photodiode matrix 2 on the chip 8 which, in the illustrated embodiment, is mounted directly on heat sink 5. It is a particular feature of the invention that fiber bundles 4 are supported by and spaced from the heat sink 5 by means of a structure including support members, so as to provide a rigid structure to the PCB assembly. These support members can be, for example, bundle holders 11 which pass through passages 27, 26 formed through the PCB 7 and substrate 6, respectively and engage bundle housings 10. These support members enable the mechanical connection of the fiber bundles 4 (the passive optical elements) to the heat sink 5 to provide mechanical stability with mechanical and thermal isolation of the fiber bundles 4 from the active optical elements on driving chip 8 by maintaining the fiber bundles at a fixed distance from chip 8. Thus, the passive optical elements will be mechanically separated from the electro optics chip (i.e., from VCSELs 1 and photodiodes 2).

According to the illustrated embodiment, micro lenses 3 are coupled to the electro optical components, enabling a free space optics connection. The light propagating in free space between fiber bundles 4 and the electro optical chips holding VCSEL matrix 1 and photodiode matrix 2 transmits data effectively. At the same time, the structure of the assembly ensures that the active and passive elements of the assembly are mechanically separate. The micro-lenses can be an integrated part of the VCSELs and/or of the photodiodes, creating a single hetero-structure of micro-lenses and electro-optical elements.

According to alternative embodiments of the invention, materials other than air can be utilized between the passive electro-optical elements and the passive optical elements. Especially useful materials are those with a high refractive index, such as GaAs. In this case, the light coupling will be better. The important criterion is that the thermo conductivity coefficient should be as low as possible, to achieve the best thermal isolation.

The preferred design of the PCB and substrate enables placement of the driving chip 8 directly on top of the heat sink 5. In this way, the system can be cooled down, for example, by using fans only. The rigid, massive and stable heat sink also serves as a support for the fiber bundle, which is clamped to it through bundle housing 10 and holders 11, as described above. This structure provides mechanical isolation for the optical elements which are connected to the heat sink. In this way, both thermal and mechanical stability are achieved, resulting in large optical component arrays working at high speed.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An optoelectronic assembly comprising:
a heat sink;
a two dimensional matrix of active optical elements coupled to the heat sink;
a two dimensional matrix of passive optical elements disposed in optical communication with said matrix of active optical elements; and
a structure mounted on said heat sink for supporting said matrix of passive optical elements, so that said passive optical elements are mechanically and thermally isolated from said active optical elements.

2. An optoelectronic chip assembly comprising:
a printed circuit board (PCB) coupled to a substrate;
an aperture formed through said printed circuit board and through said substrate;
a heat sink;
a two dimensional matrix of active electro-optical elements mounted in said aperture and connected to a driving chip controlled by said PCB; and
a two dimensional matrix of passive optical elements supported on said heat sink for optical communication and data transfer with said active electro-optical elements, with thermal isolation therefrom,
wherein said driving chip is coupled to said heat sink and the PCB is not.

3. The chip assembly of claim 2, wherein said electro-optical elements include bottom emitting VCSELs and micro-lenses integrated in a single hetero-structure.

4. The chip assembly of claim 2, wherein said electro-optical elements include photodiodes and micro-lenses integrated in a single hetero-structure.

5. The chip assembly according to claim 2, wherein said substrate has low thermal conductivity and is disposed between said drivers and said PCB.

6. The chip assembly according to claim 2, further comprising support members for supporting said passive optical elements spaced from said heat sink and mechanically isolating said passive optical elements from said active electro-optical elements.

7. The chip assembly according to claim 2, wherein said heat sink includes rigid cooling fins and said passive optical elements are rigidly affixed to said cooling fins via holders extending through holes through said PCB and said substrate.

8. An optoelectronic chip assembly, comprising:
a plurality of passive optical elements arranged in a two dimensional matrix;
a plurality of active electro-optical elements arranged in a two dimensional matrix and disposed for optical communication with said passive optical elements;
a heat sink;
a matrix of drivers for said active electro-optical elements coupled to said heat sink;
a printed circuit board (PCB) for controlling said matrix of drivers, said PCB being mechanically separated from and not in direct contact with said heat sink; and
a substrate bridging between said PCB and said matrix of drivers;
wherein said passive optical elements are thermally isolated from said active electro-optical elements.

9. The chip assembly according to claim 8, further comprising support members for supporting said passive optical elements on, but spaced from, said heat sink and mechanically isolating said passive optical elements from said active electro-optical elements.

10. The chip assembly according to claim 8, wherein said heat sink includes rigid cooling fins and said passive optical elements are rigidly affixed to said cooling fins via holders extending through holes through said PCB and said substrate.

11. The chip assembly according to claim 9, wherein said heat sink includes rigid cooling fins and said passive optical elements are rigidly affixed to said cooling fins via holders extending through holes through said PCB and said substrate.

12. The chip assembly of claim 8, wherein said active optical elements are selected from optical sources, optical detectors and optical modulators.

13. The chip assembly according to claim 8, wherein said active electro-optical elements include a plurality of VCSELs and a plurality of photodiodes.

14. The chip assembly according to claim 13, wherein said VCSELs are integrated with micro-lenses.

15. The chip assembly according to claim 13, wherein said photodiodes are integrated with micro-lenses.

16. A method for forming an optoelectronic assembly, the method comprising:

provinding a heat sink;

coupling a printed circuit board (PCB) to a substrate;

forming an aperture through said printed circuit board and through said substrate;

coupling a two dimensional matrix of active electro-optical elements to said substrate for control of said elements by said PCB;

mounting said matrix of active electro-optical elements in said aperture;

mounting a plurality of passive optical elements arranged in a two dimensional matrix in the assembly for optical communication with said active optical elements, said passive optical elements being mechanically isolated from said drivers and from said active optical elements; and coupling said driving chip to said heat sink.

17. The method according to claim 16, wherein said step of mounting includes supporting said passive optical elements on, but spaced from, said heat sink and mechanically isolating said passive optical elements from said active electro-optical elements.

\* \* \* \* \*